United States Patent Office 3,037,312
Patented June 5, 1962

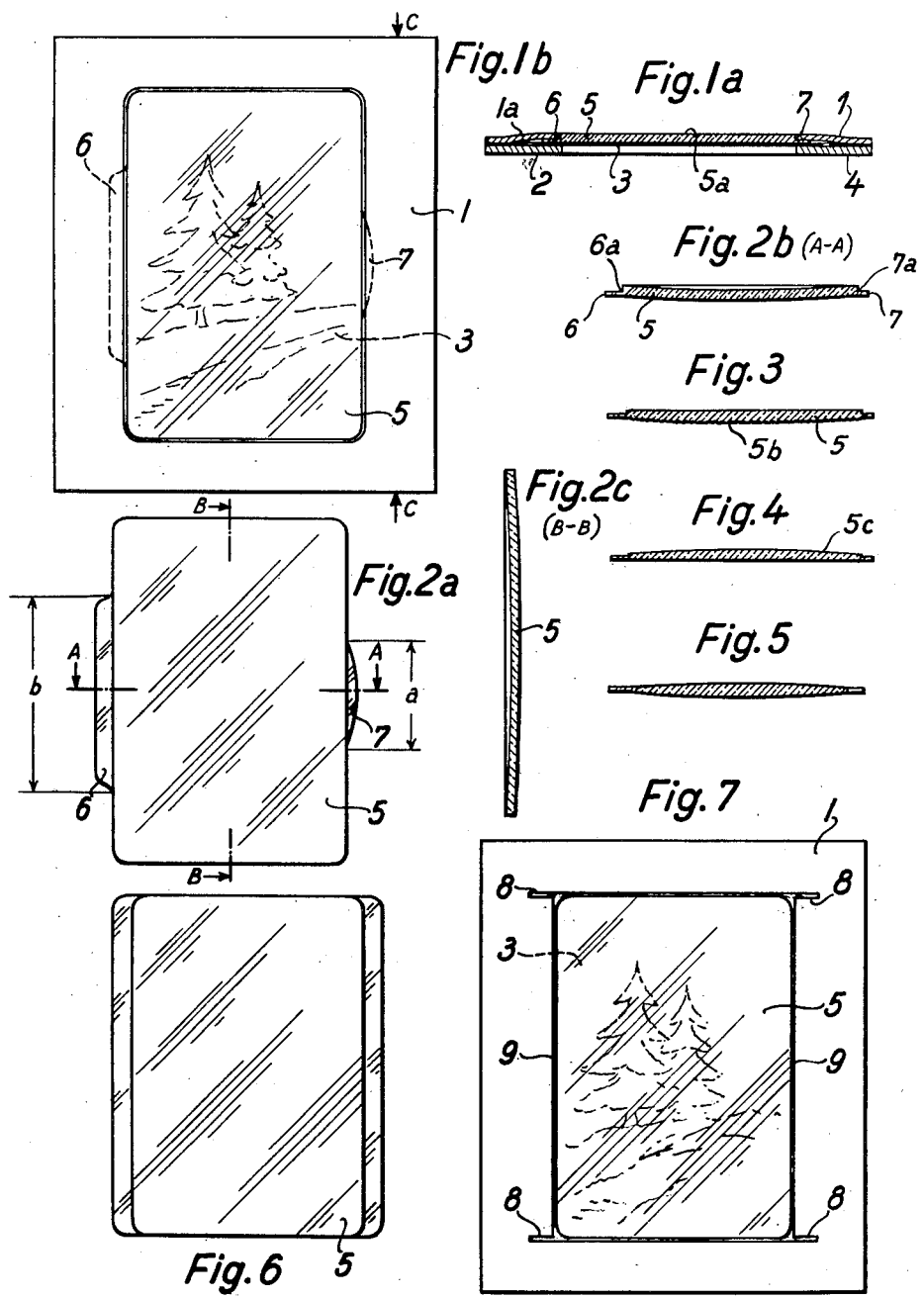

3,037,312
TRANSPARENT SUPPORTING AND PROTECTIVE DISK FOR PHOTOGRAPHIC SLIDES
Hans Mulch, Wetzlar (Lahn), Germany, assignor to Ernst Leitz Gesellschaft mit beschrankter Haftung, Wetzlar (Lahn), Germany
Filed Jan. 11, 1960, Ser. No. 1,533
Claims priority, application Germany Jan. 17, 1959
2 Claims. (Cl. 40—152)

The present invention relates to photographic slides and more particularly to a transparent plate for use as a support and protection for photographic slides.

It is known that slides mounted in a frame of cardboard, metal or plastics are subject to considerable heat radiation when introduced in a projector, due to the heat emanating particularly from the projector lamp. As a consequence, the slide tends to bulge and to become unfocussed. It is, therefore, necessary to continuously obtain a sharp image of the entire slide due to the bulged, non-planar configuration of the latter.

It has, therefore, been proposed to equip the slide changing device of the projector with a transparent pressure plate adapted for introduction into the frame of the photographic slide so as to hold the latter in position. Some of these transparent plates suffer from the disadvantage of supporting the photographic slide only in a central portion and not across the entire surface of the slide. Other plates have, to some extent, overcome this disadvantage by providing plates having the same dimensions as the visible section of the slide inside of the frame. While it is possible to use such transparent plates and to properly introduce them into the frame where the slide-exchange is done by hand, it is not possible to adjust the plate perfectly where the slide-exchange is automatically effected. In this case it is not possible to accurately adjust the pressure plate in the frame, so as to cover exactly the visible section of the slide. It would be possible to facilitate the accurate adjustment of the transparent plate by making the same somewhat smaller than the section defined by the frame. However, in such a case the edges of the pressure plate would become visible in the marginal portions of the projected image.

With the foregoing in mind it is the object of the present invention to provide a transparent plate as a support and protection for photographic slides, which can be used both in projectors with a manually or an automatically effected slide-exchange, without requiring constant refocussing of the slide in the projecting position.

It is another object of the present invention to provide a transparent plate as a support and protection for photographic slides, constituting an even support across the entire surface of the slide while being entirely invisible in the projected image of the slide.

These as well as further objects and advantages, which will become apparent as the description proceeds, are achieved by the transparent plate of the present invention having the same dimensions as the visible section of the slide mounted in a frame, and which is equipped with means for mounting the transparent plate in the frame of each particular slide.

According to the invention, the means for mounting the transparent plate in the frame can consist of laterally projecting flanges which are inserted between the slide and one of the two cardboards forming the frame for the slide.

It is also possible to provide, for each slide mounted in a frame, two transparent plates which are placed on either of the two surfaces of the slide.

The flanges constituting the means for mounting the transparent plate in the cardboard frame of the slide can be provided on two opposite sides of the transparent plate and preferably have a thickness allowing their easy introduction between the slide and cardboard plate, without causing visible bulging of the frame. The thickness of the transparent plate itself must be, of course, so chosen that a satisfactory stability is achieved. It can be advantageously composed of a transparent plastic material, but any other glass-clear transparent material can be used.

According to a preferred embodiment of the invention the transparent plate is adapted to slides used with projectors having light sources of various intensities, causing different degrees of bulging of the slide. This can be done by providing plates which have either planar surfaces or biconvex, planoconvex or convex-concave surfaces. Among these the use of a biconvex transparent plate is particularly advantageous. The displacement of image plate and focussing plate is compensated by the lens effect of such transparent plates. The curvature of the plate is preferably identical with the curvature of the bulged slide in the projecting position.

According to still another embodiment of the invention the transparent plate is provided with fine wave-shaped grooves provided at the side of the plate which is in contact with the slide. These small grooves prevent interference rings.

The invention will be more fully appreciated upon the following description of the accompanying drawings, wherein—

FIGURE 1a is a cross sectional view of the transparent plate of the invention, mounted in a frame with a slide;

FIGURE 1b is a plan view of the arrangement shown in FIGURE 1a;

FIGURE 2a is a plan view of a slightly curved transparent plate with mounting flanges at opposite sides;

FIGURE 2b is a cross sectional view, taken along lines A—A in FIGURE 2a, of the plate shown therein;

FIGURE 2c is a sectional view, taken along lines B—B in FIGURE 2a, of the plate shown therein;

FIGURE 3 is a cross sectional view of a plano-convex transparent plate with fine, wave-shaped grooves on one surface of the plate;

FIGURE 4 is a cross sectional view of a planoconvex plate, the curved side being disposed opposite to the surface coming into contact wtih the slide;

FIGURE 5 is a cross sectional view of a biconvex plate of the invention;

FIGURE 6 is a plan view of a transparent plate provided with mounting flanges extending over the entire length of the plate;

FIGURE 7 is a plan view of a frame with a slide and a transparent plate, the frame having cuts at its four interior corners, for insertion of a plate of the type shown in FIGURE 6;

Figure 8:
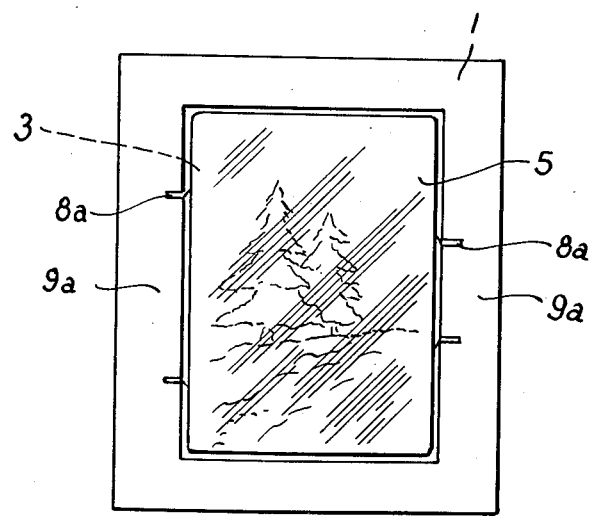
FIGURE 8 is a plan view of a frame with a slide and a plate mounted therein, the frame having cuts at its two longitudinal sides for the introduction of a plate having mounting flanges shorter than its longitudinal extension.

FIGURES 1a and 1b show an assembled slide with the two cardboard plates 1 and 2 forming a frame, the photographic picture 3 and paper frame 4 being mounted between the two cardboard plates 1 and 2. In the visible section of the photographic picture defined by the interior edges of cardboard plates 1 and 2 a support plate 5 is mounted.

According to the invention the support plate 5 has substantially the same dimensions as the visible section of the picture and is further provided at opposite sides and projecting beyond the area having the afore-said dimensions with flanges 6 and 7 for insertion between the photographic picture 3 and cardboard plate 1.

The thickness of the transparent plate 5 is so chosen that its external surface 5a is positioned in substantially the same plane as the adjoining portion of external surface 1a of cardboard plate 1. Furthermore, the thickness is so chosen that the transparent plate has a sufficient stability. By way of an example it can be stated that the transparent plate may have a thickness of from 0.3 to 1.0 millimeters.

The plate consists of a transparent material having about the same degree of transparency as glass, such as, for example, a transparent plastic material. The flanges 6 and 7 are comparatively thin so as to avoid noticeable bulges of the cardboard plate 1 when inserted between the latter and the photographic picture 3. The flange portions can have a smaller thickness than the body portion of the transparent plate, thereby forming abutment ledge portions 6a and 7a which latter come to rest against the inner edges of cardboard plates 1 and 2.

According to a preferred embodiment of the invention, the transparent plate 5 has at least one slightly curved surface as shown, for example, in FIGURES 2b through 5. FIGURE 2b shows a plate with concentrically curved surfaces, whereas FIGURE 3 shows a planoconvex plate whereof the surface 5b coming into contact with the photographic picture 3 is provided with fine wave-shaped grooves for the suppression of interference rings. FIGURE 4 shows a planoconvex plate with the surface 5c opposite to the contacting surface being curved, and FIGURE 5 shows a biconvex plate.

For easier insertion of the disk into the frame the cardboard plates 1 and 2 can be provided with cuts 8 (see FIGURE 7) allowing the flap portions 9 between two cuts to be folded upwardly when inserting the flanges 6 or 7 of the plate 5 between the two cardboard plates 1 and 2. The cuts can be either so placed that the flaps 9 extend over the entire length of the frame, or they can be shorter and have a length substantially corresponding to the length of flanges 6 and 7, as shown in FIGURE 8, thus constituting a bayonet-like connection.

The plate 5 is inserted into the frame by first introducing one of the flange, for example flange 6, between photographic picture 3 and one of the two cardboard plates 1 or 2. Thereupon the frame portion opposite to the portion where flange 6 has been introduced is bent transversely relative to the direction of introduction of plate 5, that is in the direction of arrows C, until the second flange 7 can be introduced. The introduction is thus very easy, but it can be further facilitated by the afore-described cuts 8 forming the flap portions 9. The flap portions 9 are simply bent upwardly, whereupon the flanges 6 and 7 are introduced, and the flaps are released, then holding the flanges 6 and 7 tightly in place.

It will be understood that this invention is susceptible to modification in order to adapt it to different usages and conditions and, accordingly, it is desired to comprehend such modifications within this invention as may fall within the scope of the appended claims.

What I claim is:

1. For use with a photographic slide comprising a photographic picture mounted in a frame, a transparent plate for supporting and protecting said photographic picture, said transarent plate having a body portion of substantially the same dimensions as said slide in said frame and means on said body portion for mounting said transparent plate in said frame flatly upon said photographic picture, said body portion having an inner surface coming into contact with said photographic picture and an outer surface opposite to said inner surface, said inner and said outer surface being planar.

2. For use with a photographic slide comprising a photographic picture, a frame for mounting said photographic picture therein, a transparent plate for supporting and protecting said photographic picture, said transparent plate having a body portion conforming to the dimensions of said photographic picture in said frame and means on said body portion for mounting said transparent plate in said frame flatly upon said photographic picture, and recesses in said frame for mounting said transparent plate therein.

References Cited in the file of this patent

UNITED STATES PATENTS

| 192,365 | Fleishmann | June 26, 1877 |
| 2,816,381 | Jablon | Dec. 17, 1957 |
| 2,841,903 | Christensen | July 8, 1958 |

FOREIGN PATENTS

| 14,740 | Great Britain | Oct. 19, 1915 |